United States Patent
Fischer et al.

[15] 3,684,179
[45] Aug. 15, 1972

[54] SPRINKLER HEAD RISER MECHANISM

[72] Inventors: Edward Fischer, Saline; William J. Trickey, East Lansing, both of Mich.

[73] Assignee: Superior Pipe Specialties Company, Chicago, Ill.

[22] Filed: Dec. 16, 1970

[21] Appl. No.: 98,608

[52] U.S. Cl....................................239/203, 239/587
[51] Int. Cl.........................B05b 15/10, B05b 15/08
[58] Field of Search...............239/203, 204, 205, 587

[56] References Cited

UNITED STATES PATENTS

| | | | |
|---|---|---|---|
| 2,315,911 | 4/1943 | Truedson | 239/205 |
| 3,118,609 | 1/1964 | Glover | 239/205 |

Primary Examiner—M. Henson Wood, Jr.
Assistant Examiner—Edwin D. Grant
Attorney—Cullen, Settle, Sloman & Cantor

[57] ABSTRACT

A riser mechanism for a lawn sprinkler head which includes a head-bearing riser tube telescoped for vertical adjustment within a stationary supply tube disposed underground, a spiral spring is longitudinally disposed in the stationary tube and the telescoping tube has a radial projection engageable with the threads provided by the spring. Rotation of the riser tube causes extension or retraction of the riser tube relative to the stationary tube. The upper end of the stationary tube is provided with a sleeve nut which has an inner surface engageable with the thread engaging projection of the riser tube to thereby prevent axial removal of the riser tube out of the stationary tube, and the upper end of the spring deflects to prevent jamming of the projection against the under-surface of the nut.

3 Claims, 3 Drawing Figures

INVENTORS
WILLIAM J. TRICKEY.
EDWARD FISCHER.
BY: CULLEN, SETTLE, SLOMAN & CANTOR
ATT'YS.

PATENTED AUG 15 1972

INVENTORS
WILLIAM J. TRICKEY.
EDWARD FISCHER.
BY:
CULLEN, SETTLE, SLOMAN & CANTOR.
ATT'YS.

SPRINKLER HEAD RISER MECHANISM

BACKGROUND AND SUMMARY OF THE INVENTION

The present invention relates to lawn sprinkler systems and more in particular to an improved riser mechanism for a sprinkler head thereof to adjust the sprinkler head support member relative to the ground surface.

It is known in underground installed lawn sprinkler systems to support a plurality of sprinkler head supports on vertical pipes extending from the main water supply lines below the ground. The sprinkler head support members and associated water conduits extend from the underground water supply pipes upwardly to the ground surface along which they must be retained in a flush position with the surface to permit lawn maintenance equipment to pass thereover without being obstructed.

Different portions of lawn or turf surfaces are not always on the same level, requiring some sort of adjustment relative to the underground main water supply lines which are disposed at a certain fixed depth below the ground surface.

During and after installation of underground lawn sprinkler systems in established lawsn, re-sodding of the lawn around the sprinkler heads usually result in a change of height level different from the established level of the lawn prior to installation of the system on which the installation and depth positioning of the underground pipes was based. This requires individual height adjustment of the several sprinkler head support members to compensate for the change in ground level. Such height adjustment may be necessary several times after the re-sodded lawn settles around the sprinkler heads to prevent the top surface of the sprinkler head support member from extension above the ground level.

Conventionally, adjustable lawn sprinkler head conduits are made of two tube sections threaded within each other for vertical adjustment of the upper tube section — which supports the sprinkler head — relative to the lower, stationary tube section which is attached to the main water supply pipe in the ground. Adjustment is made by relative rotation of the upper tube section for threading it in or out of the lower tube section.

This conventional arrangement is objectionable in that the exposed threads easily contaminate and corrode at a fast rate, making future vertical adjustment difficult, if not impossible. Secondly, conventional pipe or tube threads require an excessive number of revolutions to accomplish the substantial vertical adjustments which are commonly required.

A further drawback of the conventional, screw-type sprinkler head adjustment resides in the fact that continued vertical adjustment simply completely disconnects the upper tube section and sprinkler head from the lower tube section. A number of thefts of expensive sprinkler heads have occurred. Any attempt to limit the extent of adjustment of conventional threaded tubes simply results in jammed or stripped threads, ruining the installation and requiring replacement.

The present invention provides an improved adjustable riser mechanism for a lawn sprinkler head which eliminates the above disadvantages of conventional riser mechanisms of this type.

Accordingly, the primary object of the present invention is to provide an adjustable riser mechanism for a lawn sprinkler head which comprises telescopically extendable tube sections incorporating thread engaging means independent of the tube sections, for vertical rotatable adjustment of the upper tube section which supports the sprinkler head.

A further object of the present invention is to provide means incorporated into the present improved riser mechanism to prevent complete threaded disconnection of the upper tube section from the lower tube section and to thereby prevent the removal thereof by unauthorized persons, while preventing thread damage and providing a quickly adjustable, long lead thread.

The present invention will be best understood by reference to the following detailed description in connection with the appended drawings.

BRIEF DESCRIPTION OF THE DRAWINGS

The accompanying drawings illustrate a preferred embodiment in which.

DESCRIPTION OF THE PREFERRED EMBODIMENT

Figure 1:
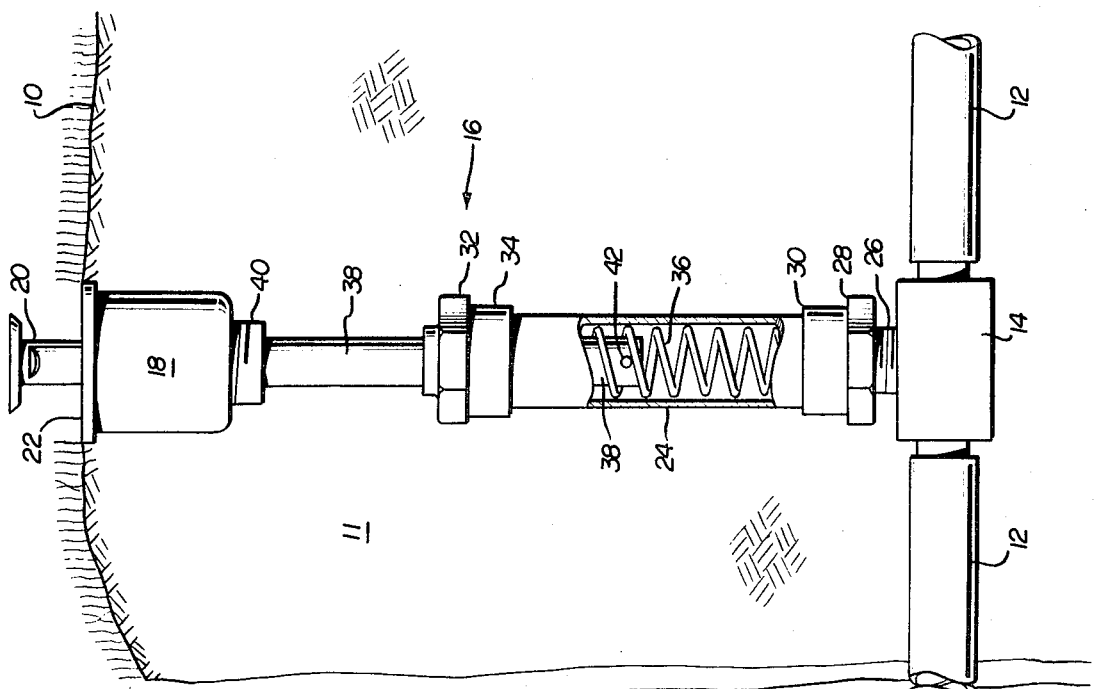
FIG. 1 is a composite schematic illustration of an underground sprinkler system embodying the present improved riser mechanism illustrated therein in normal and in adjusted position and having portions thereof broken away for illustration of portions of the internal structure thereof.
Figure 1:
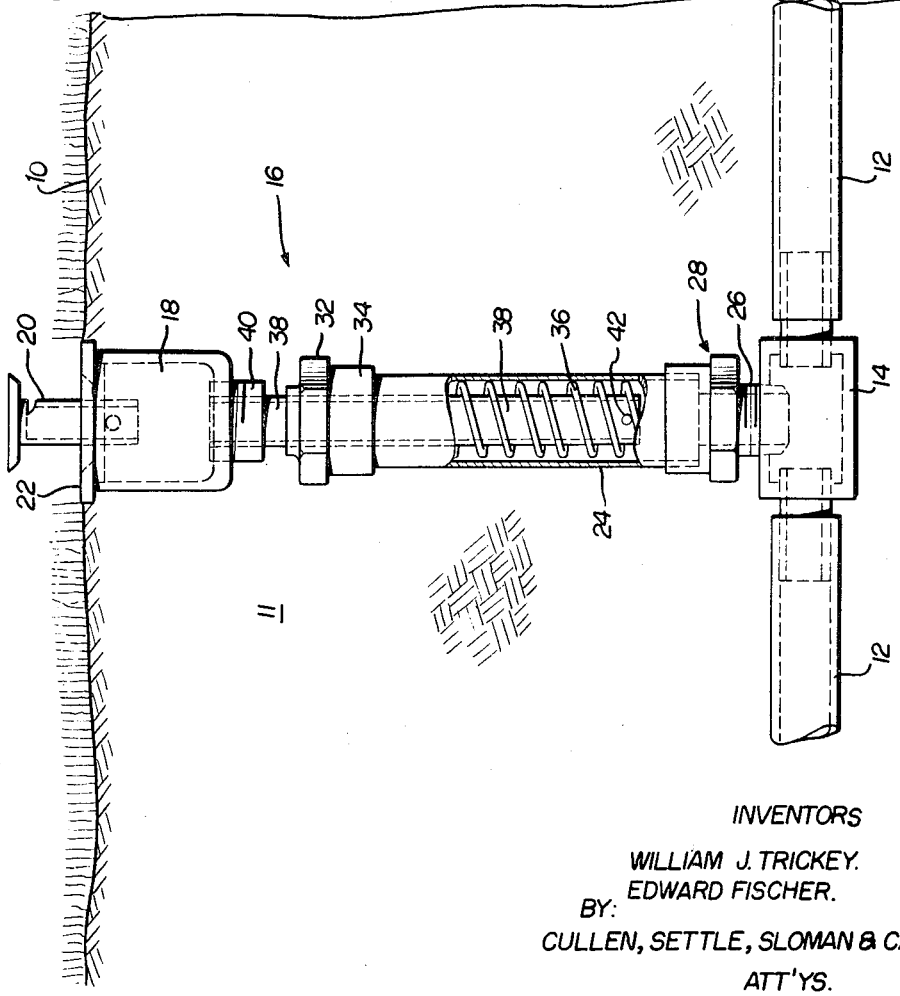
Figure 2:
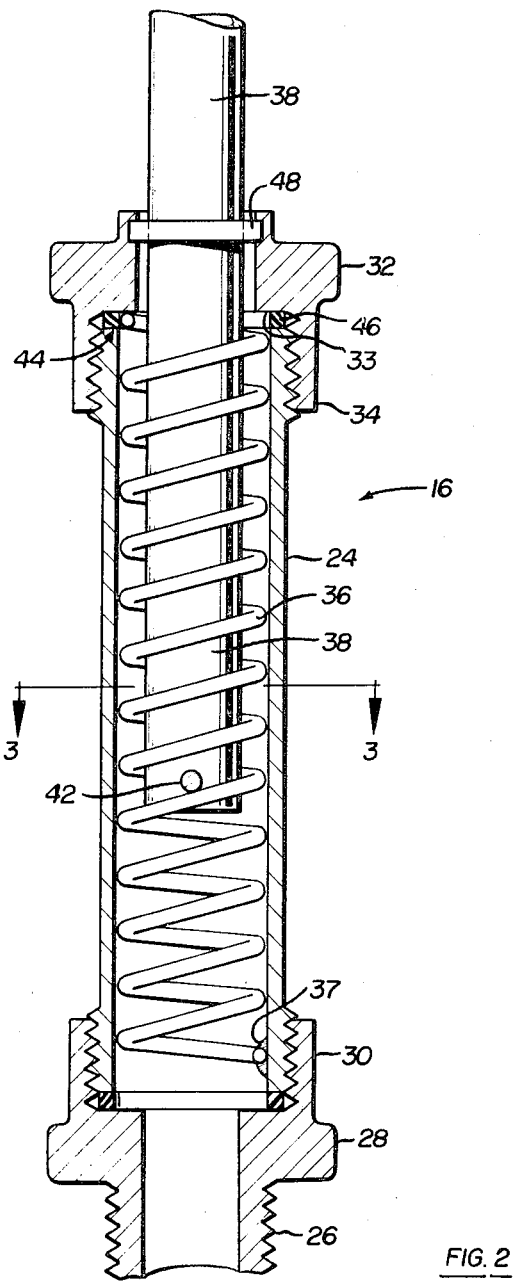
FIG. 2 is an enlarged vertical section through the riser mechanism illustrated in FIG. 1.
Figure 3:
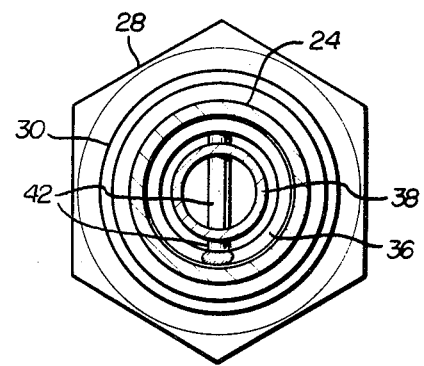
FIG. 3 is a transverse enlarged cross-section through the improved riser mechanism illustrated in FIG. 2 as seem along line 3-3 thereof.

With continuous reference to the drawings in FIG. 1, a representative underground lawn sprinkler system is shown installed in a lawn having a top surface 10. The main water supply pipe 12 is installed in the ground 11 at a certain fixed depth from the top surface 10. The main water supply pipe 12 has a plurality of branch connectors 14 located at spaced intervals therealong for the attachment of upwardly extending sprinkler head conduit assemblies 16, communicating with the pipe 12.

The vertical conduit assemblies 16 normally are attached at the upper end to a sprinkler head support member 18 which supports a sprinkler head 20. The sprinkler head 20 may be of any conventional type, such as of the pop-up and/or rotatable type, and per se forms no part of the present invention.

The sprinkler head support member 18 normally has a top plate 24 which, when the system is properly installed, is adapted to be substantially flush with the lawn surface 10 so as not to provide an obstruction.

The lawn surface 10 around the plurality of individual sprinkler head conduit assemblies 16 (only two of which are shown in FIG. 1) may not be on a common level throughout, but instead around any one of the sprinkler head conduit assemblies 16 the lawn surface 10 may be higher than at other points, as indicated at the right in FIG. 1, requiring vertical upward adjustment of the sprinkler head conduit assembly 16 relative to the stationary underground main water supply pipe 12, as shown.

Likewise, of course, the ground surface 10 around any one sprinkler head conduit assembly 16 may be lower than the remainder of the lawn surface in which case, of course, the conduit assembly 16 must be adjusted vertically downwardly relative to the stationary water supply pipe 12.

In accordance with the present invention, the sprinkler head conduit assembly 16 embodies the present improved riser mechanism to vertically adjust the sprinkler head support member 18 so that the top plate 22 will be maintained flush with the ground surface at any ground level.

The conduit assembly 16 is composed of outer tube section 24 having a threaded end portion 26 for attachment to the connector 14. The threaded portion 26 further provides a threaded engagement with a sleeve type nut 28 which has a skirt portion 30 for extension over the end of the outer tube. The nut 28 may be integral with the lower end of the outer tube 24 or may be separate therefrom and integral with the threaded portion 26 in which instance, the lower end of the outer tube 24 is supported with the skirt portion 30 of the nut 28.

The upper end of the outer tube 24 is threaded to receive a similar sleeve type nut 32 having a skirt portion 34 for extension around the upper end of the outer tube 24.

The outer tube 24 retains a screw member 38 longitudinally disposed therein substantially along the entire length of the tube. The screw member 36 is in the form of a helical compression spring and may be securely attached internally of the tube 24 at the lower end thereof by welding, as at 37, or by any conventional securing means known in the art. Alternatively, the spring may be retained in the tube 24 by the surface friction therebetween, e.e., the relaxed exterior diameter of the spring may be greater than the interior diameter of the tube.

The head of the upper sleeve type screw member 32 is axially bored in alignment with the internal bore of the outer tube 24 in order to receive an inner tube member 38 for telescopic support within the outer tube 24. The inner, telescoping tube 38 is provided with a threaded portion 40 at its upper end for threaded locking engagement with the sprinkler head support member 18 which is supported thereon.

It will be understood, that the axial bore of the inner tube 38 communicates with the sprinkler head 20 through the sprinkler head support member 18 to permit fluid communication from the water supply pipe 12 to the sprinkler head.

The lower end of the inner tube 38 is provided with a pin 42 extending radially therethrough in diametrical direction for extension outwardly thereof at both sides of the tube. It will be noted that the pin 42 may be slightly angularly inclined relative to the central axis of the tube 38 for a purpose to appear. The outer end of the pin 42, in assembly, is adapted to be in engagement between adjacent coils of the spring 36. The direction of inclination of the pin 42 is in opposite direction to the helical angle of the coils of the spring 36. Thus, the coil of the spring 36, in effect, provides a female thread member whereas the opposite outer ends of the pin 42 provide a male thread member for threading engagement with the coils of the spring 36. It will be understood, that instead of a continuous pin such as 42, separate abutments may be provided and secured to the outside of the tube 38 on both sides and in proper position corresponding to the position of the opposite outer ends of the pin 42, or integral projection may be formed on the tube 38 for engagement with the spring 36.

Thus, in order to vertically adjust the sprinkler head support member 18, the support member 18 is rotated in the desired direction by customarily engaging a tool with the ground plate 22. Rotation of the support member 18 rotates the inner tube 38 in the same direction, causing either outer end of the pin 42 to ride up or down (depending on direction of rotation) along the spiral coils of the spring 36, thereby vertically displacing the tube 38 relative to the outer tube 24. Upon attempted vertical removal of the inner tube 38, the pin 42 simply deflects downwardly and rides over the free upper end of the spring 36.

The upper sleeve type nut member 32 provides an inner redial flange 33 which effectively prevents complete disconnection of the inner tube 38 from the outer tube 24 when the pin 42 reaches the upper end of the coils of the spring 36. Thus, since the upper sleeve type nut member 32, in installation, is disposed a considerable distance below the ground surface 10 and embedded within the ground, unauthorized removal of the riser and sprinkler head assembly 18,20 and tube 38 is not possible, unless the ground is dug up around the sprinkler head to get to the nut member 32, which must be unscrewed first from the outer tube 24 (which is likewise embedded in the ground) to permit removal of the completed sprinkler head and riser assembly.

The upper sleeve type nut member 32 also retains a sealing assembly 44 comprised of a ring member 46 adapted for abutment circumferentially around the upper edge of the outer tube 24 to provide a sealing surface for an associated O-ring 48 disposed circumferentially around the inner tube 38. Thus, when the sleeve type nut member 32 is tightened upon the threaded upper end of the outer tube 24, the sealing assembly 44 is compressed in sealing contact to provide an effective seal between the upper end of the outer tube 24 and the nut member 32 to prevent the entrance of moisture of contaminants into the outer tube 24 for protection of the riser mechanism against contamination and corrosion. If desired, a similar sealing arrangement may be provided at the lower end of the outer tube 24 in conjunction with the lower nut member 38.

The resilient female thread member 36 is unattached at its upper end and thus, by virtue of engagement of the pin 42 with the coils of the spring 36, a slight vertical flexibility of the sprinkler head assembly is provided for so that, if the top plate 22 should project slightly above the ground surface 10 or the ground surface immediately around the sprinkler head is not solid enough, the sprinkler head support member 18 is able to be resiliently displaced downwardly if a load is placed thereon by walking thereover or by contact with lawn maintenance machinery. Thus, there is provided an additional advantageous feature incorporated in the present improved riser mechanism which effectively prevents damage to the sprinkler head when contacted by machinery or other means, by being able to be flexibly depressed downwardly and thereafter resume its position when the load is removed.

The spring 36 has other functional advantages as the thread-defining member. For example, the spring can deflect from its normal cylindrical configuration and the outer tube 24 can be formed of a non-rigid material, such as rubber or plastic. This makes possible the provision of adjusting threads within a flexible hose, the spring also prevents collapsing or kinking of the hose at its curved portion. The spring also resiliently collapses and extends to serve as a damping means, preventing hammering in the system when it is suddenly turned on. The resultant surge of water under pressure against the sprinkler head merely deflects the spring coils. The prevention of damage to the system will be appreciated.

It will be evident from the foregoing description, in conjunction with the illustrations in the drawings, that the present invention provides an improved riser mechanism for a sprinkler head, which is relatively simple in structure, easy to assemble and of low cost and is highly effective as a screw type vertical adjustment mechanism without the inherent disadvantages of conventional riser mechanisms of this type.

The wear characteristic of the present riser mechanism is relatively low and, by provision of the improved sealing arrangement, the mechanism is completely protected against contamination and corrosion.

The primary feature of the present improved riser mechanism consist in the fact that the sprinkler head and riser assembly cannot be removed from its underground connection without digging up the ground around the sprinkler head, to therefore provide an effective theft prevention means.

Furthermore, by the use of the flexible thread member, incorporated in the present improved riser mechanism, the sprinkler head is flexibly supported to permit displacement thereof when a load is placed thereon to prevent possible damage to the sprinkler head.

Although the present invention has been described in conjunction with a preferred embodiment, it will be obvious that various modifications in detail and arrangement may be made without departing from the spirit and characteristic thereof as defined by the scope of the appended claims.

What is claimed is:

1. A vertically adjustable sprinkler head riser mechanism comprising:

a vertically arranged outer tube having a cap sealing its upper end;

an inner tube telescoped within said outer tube and projecting upwardly and outwardly through an opening in said cap, said inner tube carrying a sprinkler head on its upper end;

sealing means for providing a watertight seal between said inner tube and said cap while permitting axial movement and rotation of said inner tube within said outer tube;

a helical spring concentrically arranged within said outer tube and surrounding said inner tube, the lower end of said spring being fixed to said outer tube to prevent rotational or axial movement of said lower end of said spring, the upper end of said spring abutting the underside of said cap but being free of any connection with said cap or said outer tube, said spring functioning as a female thread;

male thread means projecting laterally outwardly from said inner tube adjacent its lower end and dimensioned to fit into the gap between adjacent coils of said spring, said inner tube being vertically supported and positioned by the engagement of said male thread means with said spring, but said spring otherwise normally exerting no force on said inner tube;

rotation said inner tube normally causing said male thread means to advance upwardly or downwardly along said spring, depending upon the direction of rotation, thereby to adjust the vertical height of said inner tube relative to said outer tube.

2. In the riser mechanism as defined in claim 1, in which the upper end of said compression spring is free to deflect axially downwardly within said outer tube, said spring being free to flex upon displacement of said sprinkler head when subjected to a load, with the parts being so dimensioned that the upper end of said spring allows the projecting pin to slide freely past it downwardly when the inner tube is pushed down from its extreme upper most position.

3. In a sprinkler head riser mechanism comprising an outer tube and an inner tube telescoped therein and carrying a sprinkler head on its upper end, wherein a threaded connection is provided between male threads on said inner tube and female threads in the form of a helical spring concentrically surrounding said inner tube within and fixed to said outer tube, the improved method for adjusting the normal height of the sprinkler head which comprises:

rotating said inner tube, thereby to cause said inner tube to advance or retract within said outer tube as said male threads travel along said spring.

* * * * *